United States Patent [19]

Meise

[11] 4,240,111

[45] Dec. 16, 1980

[54] VERTICAL SYNC SEPARATOR

[75] Inventor: William H. Meise, Wrightstown, Pa.

[73] Assignee: RCA Corporation, New York, N.Y.

[21] Appl. No.: 26,814

[22] Filed: Apr. 4, 1979

[51] Int. Cl.³ .............................................. H04N 5/10
[52] U.S. Cl. .................................... 358/154; 358/158; 358/155
[58] Field of Search ............... 358/154, 155, 148, 158; 179/15 BS, 15 BC; 328/139

[56] References Cited

U.S. PATENT DOCUMENTS

| | | | |
|---|---|---|---|
| 3,526,714 | 9/1970 | Fisk ........................................ | 358/158 |
| 3,751,588 | 8/1973 | Eckenbrecht ......................... | 358/158 |
| 3,878,335 | 4/1975 | Balaban ................................ | 358/154 |
| 3,909,724 | 9/1975 | Spoth ................................... | 178/69.1 |
| 3,991,379 | 11/1976 | Chadwick ........................... | 178/69.1 |
| 4,027,261 | 5/1977 | Laurent ................................ | 328/63 |
| 4,112,498 | 9/1978 | Reiner ............................... | 179/15 BS |

*Primary Examiner*—Benedict V. Safourek
*Assistant Examiner*—Michael Allen Masinick
*Attorney, Agent, or Firm*—Eugene M. Whitacre; Paul J. Rasmussen; Joseph J. Laks

[57] ABSTRACT

A composite video signal is coupled to the input of a tapped delay line of a vertical sync separator. A detector determines the presence of the vertical sync signal profile within the sampled portion of the composite video. An output signal is produced by the separator when the appropriate vertical sync profile is thus detected.

20 Claims, 9 Drawing Figures

VERTICAL SYNC SEPARATOR

BACKGROUND OF THE INVENTION

This invention relates to vertical sync separators for television receivers, for example.

In the vertical blanking interval of a standard NTSC composite video signal, six serrated vertical sync pulses are provided for use by the vertical sync separator circuit of a television receiver. Typical separator circuits include an RC integrator which integrates the serrated vertical sync voltage. The integrator output is coupled to a comparator. When the integrated sync voltage exceeds a predetermined threshold level, the comparator generates an output pulse for synchronizing the vertical deflection circuit scanning current.

Such vertical sync separators are sensitive to noise superimposed on the serrated vertical sync pulses. The sensitivity to noise increases as the RC integrator charges toward the threshold level. Thus, when the integrator is charged to near the threshold level even very small amplitude noise signals of the same polarity as the serrated vertical sync pulse will cause early triggering of the separator, and noise signals of the opposite polarity subtract from the integrator charge and thereby delay triggering. The vertical synchronization is dependent upon the time at which the sync separator comparator triggers. In the presence of noise, the comparator threshold may be crossed and recrossed several times near the transition time. Since noise is unavoidable in a broadcast signal, the vertical synchronization is unstable and may jitter under normal operating conditions.

The integrator-type sync separator is particularly sensitive to noise pulses having a relatively long duration and high amplitude. The integrator operates upon such noise pulses as it would upon a vertical sync signal, and may produce output pulses falsely indicating the occurrence of a sync pulse in the interval between true sync pulses. This completely unstabilizes the deflection and results in vertical "rolling" of the displayed images.

A large body of art has developed for compensating for the deficiencies of the RC integrator sync separator. For example, some vertical count-down systems generate a vertical-rate signal independent of the vertical synchronizing signal for synchronizing the deflection. The signal produced by the sync separator is processed by the various count-down systems in a variety of manners to reconcile the variations in comparator triggering time. The reconciled time is then used to synchronize the independently generated vertical-rate signal.

The vertical count-down arrangements ameliorate the basic jitter problem of the RC integrator, but do not solve it. In ameliorating the jitter, these systems may become too sensitive to noise and may therefore fail to recognize synchronizing signals which are only slightly obscured. For example, U.S. Pat. No. 3,878,335 issued Apr. 15, 1975 to Balaban describes a vertical count-down synchronizing system. In the Balaban arrangement, the integrator output is applied to a comparator which produces a digital output representative of the polarity of the integrator output relative to a threshold level. The bilevel comparator output is applied to the input of an eight-bit shift register. Each bit in the shift register is coupled to a separate input terminal of an AND gate. The output of the AND gate goes high when the bilevel comparator output pulse is of the requisite duration to indicate the presence of a vertical sync signal.

In the presence of small amounts of noise near the bilevel comparator threshold, the comparator may, as mentioned, cross and re-cross the threshold several times, resulting in a comparator output in which the effect of the noise has been increased out of proportion to its magnitude. The shift register and AND gate are therefore unable to distinguish between small amounts of noise perturbing a sync signal and large-magnitude noise having the same general width as a sync pulse. Slight perturbations of the sync signal by noise then, result in a digital signal which does not match the ideal pulse. The count-down arrangement does not respond to such a perturbed sync signal and may not update its internal generator. Digital count-down arrangements thus may be seen to compensate for the excessive sensitivity of the RC integrator type of sync signal separator to small amounts of noise and for its response to low-frequency noise signals by ignoring all but substantially perfect sync pulses. This does not take advantage of the information available in sync pulses containing moderate amounts of noise.

It is advantageous to design a vertical sync detector or separator which provides increased noise immunity and relatively stable sync pulses in the presence of noise.

SUMMARY OF THE INVENTION

A delay line stores successive portions of an input signal that includes a vertical sync signal. The capacity of the delay line is sufficient to store a uniquely profiled portion of the vertical sync signal. The stored signal is sampled and processed to produce a compressed pulse upon the occurence of the vertical sync signal. An output circuit produces a vertical output signal in response to the development of the compressed pulse.

BRIEF DESCRIPTION OF THE INVENTION

Figure 1:
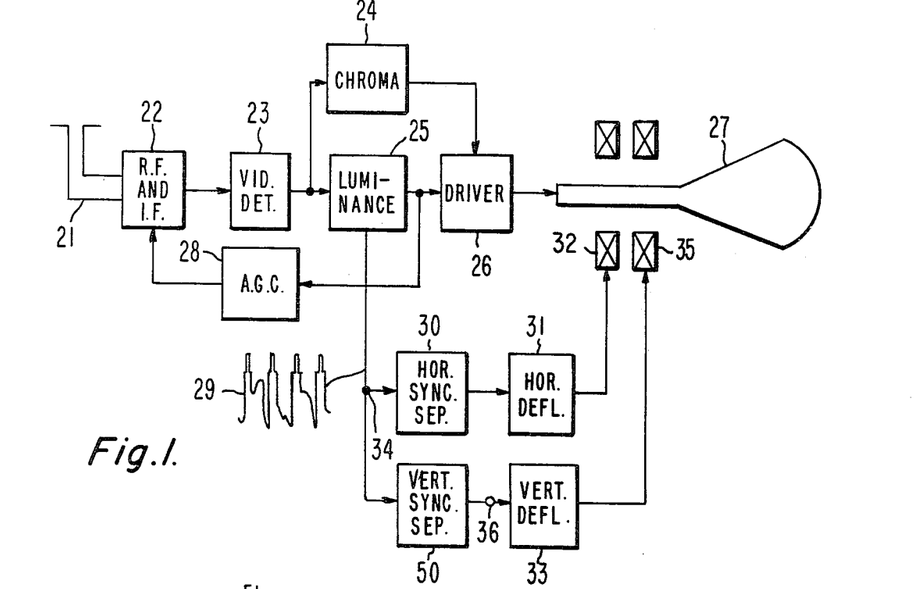
FIG. 1 illustrates in block diagram various circuit functions within a television receiver, including a vertical sync separator embodying the invention.

In FIG. 1, signals intercepted by an antenna 21 are applied to a television receiver radio frequency (RF) and intermediate frequency (IF) circuit 22. Circuit 22 includes such conventional circuits as a tuner, radio frequency amplifier, oscillator, mixer and intermediate frequency amplifier. The IF signal obtained at the output of circuit 22 is coupled to a video detector 23, wherein the IF signal is processed to provide a composite video signal for a chrominance signal processor 24 and a luminance signal processor 25. Chroma and luminance information are coupled to a kinescope driver circuit 26 to appropriately energize the various electrodes, not illustrated, of a color kinescope 27. An automatic gain control circuit 28 is coupled to an output of the luminance processor 25 to control, in a conventional manner, the gain of selected portions of the RF and IF circuit 22.

Another output of luminance processor 25 provides a composite video signal 29 at an input terminal 34. Composite video signal 29 is coupled to a horizontal sync separator 30 to provide horizontal synchronizing information to a horizontal deflection circuit 31. Horizontal deflection circuit 31 generates a synchronized horizontal scanning current in a horizontal deflection winding 32.

Composite video signal 29 is also coupled to a vertical sync separator 50, embodying the invention, to be further described below. Vertical synchronizing information from vertical sync separator 50 is developed at an output terminal 36 and coupled to a vertical deflection circuit 33. Vertical deflection circuit 33 then generates a synchronized vertical scanning current in a vertical deflection winding 35.

Figure 2:
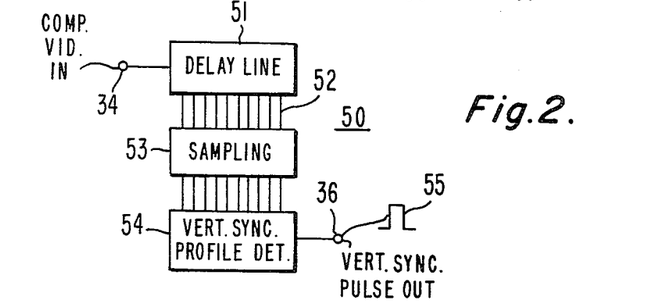
FIG. 2 illustrates in block diagram form a vertical sync separator embodying the invention.

Illustrated in FIG. 2 is a block diagram schematic of a vertical sync separator 50, embodying the invention. A composite video signal at terminal 34 is coupled to a delay line 51 for enabling successive portions of the composite video signal stored in the delay line to be sampled. Taps 52 are coupled from the delay line 51 to a sampling circuit 53 for sampling the successive portions of the composite video signal. A vertical sync profile detector 54 weighs and compares the sampled composite video to reference voltages. When profile detector 54 provides a sufficient matching of the composite video with the profile of a standard vertical sync signal portion, a vertical sync output pulse 55 is generated at output terminal 36. Output signal 55 is then coupled to vertical deflection circuit 33 of FIG. 1 to provide for a synchronized vertical scan. In the interval between synchronizing signals, composite video other than vertical sync is applied to profile detector 54. The profile detector 54 will be unresponsive to these signal portions.

Figure 3:
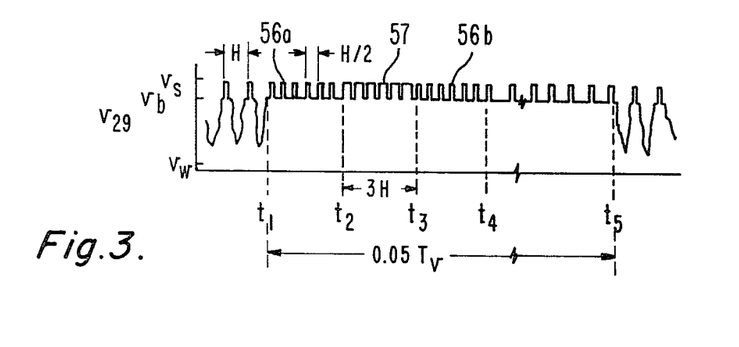
FIG. 3 illustrates a composite video waveform.

Composite video signal 29 is illustrated in FIG. 3 by the composite video voltage $V_{29}$. The vertical blanking interval extends between times $t_1$–$t_5$, or for a duration of approximately $0.05T_v$ in the NTSC system, where $T_v = 1/60$ second. FIG. 3 also illustrates approximately the last two horizontal scanning lines of camera information occurring prior to time $t_1$. At time $t_1$, the beginning of vertical blanking, the composite video voltage $V_{29}$ increases to the blanking voltage level $v_b$. The white level of composite video voltage $V_{29}$ is indicated by the level $v_w$. Between times $t_1$–$t_2$, six equalizing pulses, 56a, are developed, each pulse being separated by an interval H/2, where H = 63.5 microsecond, the horizontal scanning interval. The amplitude of each equalizing pulse equals the sync tip voltage level $v_s$. Between times $t_3$–$t_4$, another six equalizing pulses 56b are developed. Horizontal sync pulses are developed during the latter part of the vertical blanking interval, between times $t_4$–$t_5$. After time $t_5$, horizontal scanning and camera information is again produced for the next field.

The vertical sync pulse interval, between times $t_2$–$t_3$, is uniquely characterized by six serrated pulses of H/2 duration. The amplitude of each pulse equals an amplitude $v_s$, the sync tip voltage level, except during the occurrence of a serration, when the vertical sync pulse amplitude equals the blanking voltage level $v_b$. The actual voltage values of $V_s$ and $V_b$ are established by the particular operation characteristic of automatic gain control circuit 28. The unique pulse profile of sync pulse 57 is recognized by the vertical sync separator 50 to produce a vertical sync output pulse 55.

Figures 4, 5:
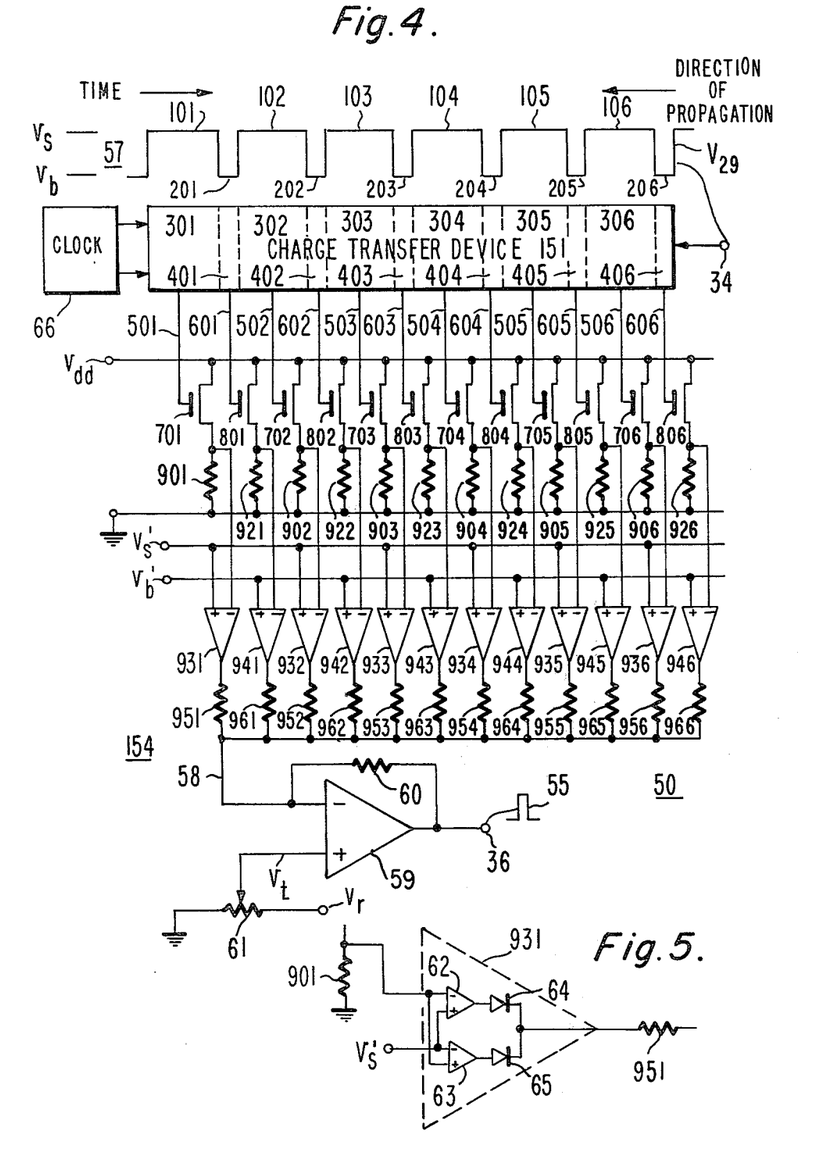
FIG. 4 illustrates an electrical schematic circuit of a vertical sync separator embodying the invention.
FIG. 5 illustrates a window comparator which may be used in the circuit of FIG. 4.

As illustrated in FIG. 4, an embodiment of sync separator circuit 50 of FIG. 1 or 2 includes, as a delay line, a charge transfer device (CTD) 151, such as a bucket brigade device or a charge coupled device. The composite video voltage $V_{29}$ is injected, at input terminal 34, into CTD 151 as charge packets flowing into the potential wells of the CTD, at a rate determined by clock pulses obtained from a clock 66. Clock 66 functions in a conventional manner to enable transfer charge packets from one potential well to the next adjacent one along the CTD line. Thus, each potential well of the CTD samples successive portions of composite video voltage $V_{29}$ at a sampling rate determined by clock 66. The amount of charge in a well will be a function of the sampled voltage. Thus successive portions of the composite video information is stored in analog fashion in the potential well regions of the CTD.

The capacity of the delay line, CTD 151, is selected to store the entire vertical sync pulse 57. Thus, at time $t_3$ of FIG. 3, all the potential wells of CTD 151 are filled with vertical sync pulse information, as is illustrated in FIG. 4. Regions 301–306 contain information associated with the sync tip portions 101–106 of vertical sync pulse 57, whereas, regions 401–406 contain the serrated portions 201–206.

Each one of a group of tap electrodes 501–506 and 601–606 provides an output signal representative of the charge stored in a representative potential well in a respective one of the regions 301–306 and 401–406 of CTD 151. Thus each of the signals of a respective tap electrode represents the voltage level of a sampled point of composite video voltage $V_{29}$.

Tap electrodes 501–506 and 601–606 are coupled to respective gate electrodes of respective field effect transistors (FET) 701–706 and 801–806. The drain electrode of each FET is coupled to a $V_{DD}$ supply rail. The source electrodes of respective FET 701–706 and FET 801–806 are coupled to respective sampling resistors 901–906 and 921–926. Tap electrodes 501–506 and 601–606, FET's 701–706 and 801–806, and resistors 901–906 and 921–926, thus, form a sampling network 153, which converts the sampled charge quantities in regions 301–306 and 401–406 of CTD 151 into sampled voltage quantities developed across sampling resistors 901–906 and 921–926. Other suitable FET arrangements may be used to provide output signals representative of the sampled quantities. The presence or absence of a vertical sync pulse 57 in CTD 151 is determined by a vertical sync profile detector 154, which functions as a pulse compression filter, including differential comparators 931–936 and 941–946. The negative input terminals of comparators 931–936 are coupled to respective sampling resistors 901–906 and the negative input terminals of comparators 941–946 are coupled to respective sampling resistors 921–926. The positive input terminals of comparators 931–936 are coupled to a reference voltage $v_s'$ and the positive input terminals of comparators 941–946 are coupled to a reference voltage $v_b'$.

The voltage developed across each of the sampling resistors will be a function of the particular voltage point of composite video voltage $V_{29}$ that is sampled in the associated sampling region of the CTD. When vertical sync pulse 57 just fills CTD 151, as illustrated in FIG. 4, at the time $t_3$ of FIG. 3, the voltage $v_s'$ is developed across each of the sampling resistors 901–906, corresponding to the sampled voltage $v_s$ of sync tip portions 101–106. Also, the voltage $v_b'$ is developed across each of the sampling resistors 921–926, corresponding to the sampled voltage $v_b$ of serrated portions 201–206.

The output of each of the comparators 931–936 and 941–946 is coupled to a summing line 58 through one of the respective weighting resistors 951–956 and 961–966. When vertical sync pulse 57 fills CTD 151, the output of each comparator is a null, providing for a null sum voltage or sum signal on summing line 58, indicative of the occurrence of a vertical sync pulse. That is, the output of the summing line 58 is a compressed pulse reaching a maximum excursion to near the null voltage at time $t_3$ of FIG. 3.

Summing line 58 is coupled to the negative input terminal of a differential comparator 59. A feedback resistor 60 is coupled between the output terminal 36 of comparator 59 and the negative input terminal. An adjustable threshold voltage $v_t$ is established at the positive input terminal of comparator 59 by coupling the positive input terminal to a wiper arm of a potentiometer 61. Potentiometer 61 is coupled across reference voltage $v_r$, thereby providing the threshold voltage level of comparison for comparator 59. When vertical sync pulse 57 fills CTD 151, a null sum voltage is coupled to the negative input terminal of comparator 59. The ouput of comparator 59 then goes high, producing a positive output sync pulse 55 at terminal 36.

At instants earlier or later than $t_3$, composite video information other than sync pulse voltage 57 is stored in CTD 151. Not all of the comparators 931–936 and 941–946 are developing null outputs and the sum voltage on line 58 in non-zero. Output terminal 36 remains low, provided the sum voltage exceeds $v_t$, indicating the absence of any or of a complete vertical sync pulse.

Use of vertical sync separator 50 embodying the invention, as illustrated in FIG. 4, for example, provides increased sync separator noise immunity over typical conventional vertical sync separators. Since the sampled voltages of all the sampled points of serrated sync pulse 57 are summed in summing line 58, noise superimposed over any given sample point, that is noise occurring at any given instant of the sync pulse interval $t_2$–$t_3$ is no more likely to trigger an output sync pulse than noise occurring at any other given instant within the sync pulse interval.

By selecting the appropriate gain characteristics for comparators 931–936 and 941–946, predetermined amounts of voltage deviations about the level $V_s$ due to noise superimposed on the sync tip portions 101–106, and deviations of serrated portions 201–206 about voltage level $v_b$ will, in turn, produce corresponding voltage deviations of the comparator outputs about the null output. Summing the comparator outputs will result in some averaging out of the effects of the noise. This averaging effect as predetermined noise levels provides for enhanced detection of the vertical sync pulse.

It should be noted that the number tap lines 501–506 and 601–606 are for illustrative purposes only. Each tap line in an assigned one of the regions 301–306 and 401–406 of CTD 151 is representative of the several taps which may actually be provided, the sampling density being determined, by well known criteria. Similarly, the clocked sampling rate is also determined by well-known criteria.

Since the vertical sync profile is uniquely determined in part by the serrated portions of the vertical sync pulse, it may be desirable to give greater weight to the high frequency serrated portions 201–206 of vertical sync pulse 57 to provide for greater signal-to-noise output in the presence of relatively low frequency noise. Such added weight to the serrated portions may be provided in various manners. The sampling density in regions 401–406 may be increased. MOS transistor amplifiers may be coupled to the outputs of FET 701–706 and 801–806, with the gate voltages of the transistors amplifiers being different for those associated with FET's 701–706 than for FET's 801–806. The resistances of sampling resistors 921–926 may be increased, or the resistances of resistors 961–966 may be decreased.

The signal coupled to input terminal 34 need not be the entire composite video signal 29 obtained from luminance processor 25. Rather, the video signal information may be removed, resulting in only a composite sync signal coupled to input terminal 34. What is required for vertical sync separator 50 to function is that a unique vertical signal profile be coupled to the delay line.

It may be desirable, in order to obtain greater low frequency noise immunity, to design each one of comparator 931–936 and 941–946 as a window comparator which provides a positive output for deviations in the input signal that are either greater or lesser than the reference voltage. FIG. 5 illustrates a representative window comparator, comparator 931. Window comparator 931 comprises two differential amplifiers 62 and 63 with outputs coupled to resistor 951 through diodes 64 and 65 respectively. The input signal developed across resistor 901 is coupled to the negative input terminal of amplifier 62 and is coupled to the positive input terminal of amplifier 63. The voltage $V_s'$ is coupled to the negative input terminal of amplifier 63 and the positive input terminal of amplifier 62. Use of a window comparator of this sort has the advantage that noise superimposed upon the serrated synchronizing pulse which tends to obscure the profile cannot average to zero over several tap points and therefore cannot be misinterpreted by the profile detector as an ideal profile.

Figure 6:
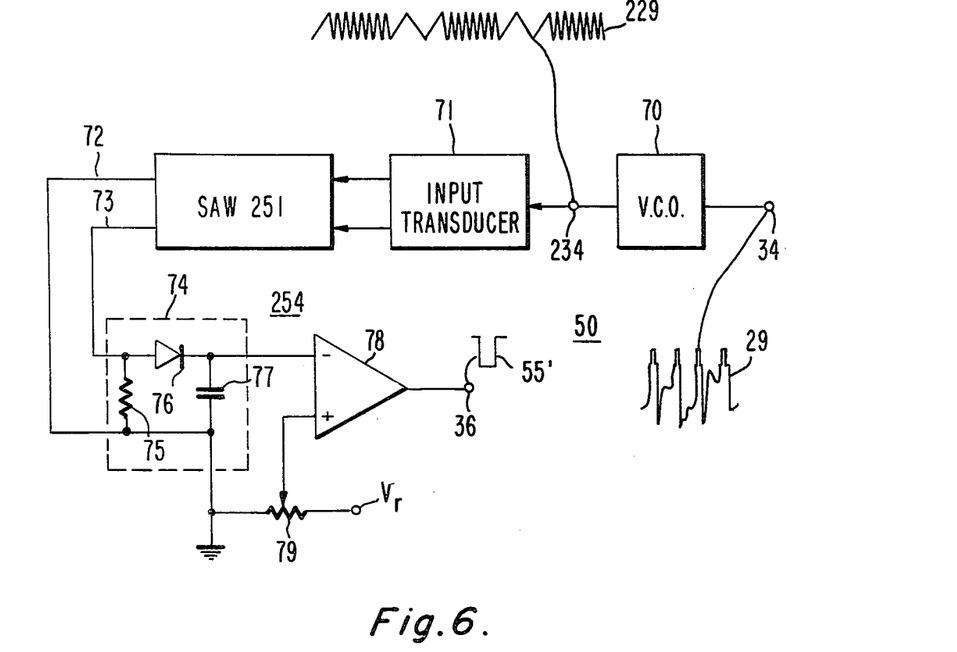
FIG. 6 illustrates another vertical sync separator embodying the invention, using a surface acoustic wave device.
Figures 7, 9:
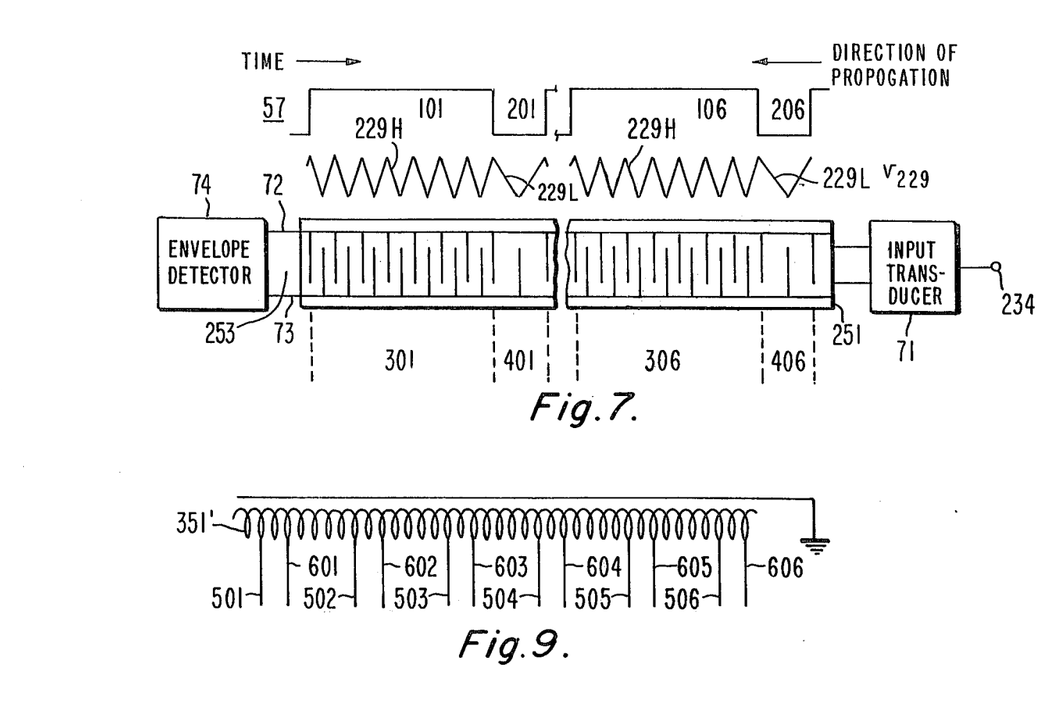
FIG. 7 illustrates a portion of the separator of FIG. 6 including the surface acoustic wave device.
FIG. 9 illustrates the delay line portion of the separator of FIG. 8 using a lumped LC element as the delay line.

FIGS. 6 and 7 illustrate a vertical sync separator 50, employing the invention, and using a surface acoustic wave (SAW) device 251 as a delay line. The composite video information is inputted into SAW 251 as a frequency modulated analogue signal rather than an amplitude modulated voltage. Composite video signal 29 with amplitude voltage variations is coupled at input terminal 34 to a voltage controlled oscillator (VCO) 70. VCO 70 produces a composite video voltage 229 that is frequency modulated in accordance with the input voltage amplitude variations.

Frequency modulated composite video signal 229 is coupled to an input transducer 71 of surface acoustic wave delay line 251 which converts composite video signal 229 into a modulated acoustic wave that propagates along the surface of the substrate of device 251. At time $t_3$ of the composite video waveform $V_{29}$ of FIG. 3, frequency modulated composite video voltage $V_{229}$ fills the length of SAW 251, as illustrated in FIG. 7. In regions 301 and 306, for example, during the occurrence of the sync tip portions 101 and 106 of vertical sync pulse 57, the portions of frequency modulated composite sync voltage $V_{229}$ located in the regions 301 and 306 are relatively high frequency signals 229H, for example. In regions 401 and 406, for example, during the occurrence of the serrated portions 201 and 206 of vertical sync pulse 57, the portions of frequency modulated composite sync voltage $V_{229}$ located in the regions 401 and 406 are relatively low frequency signals 229L.

A sampling network 253 comprising interdigitated electrode fingers is deposited on the substrate of SAW 251. The spacing of the electrodes in regions 301 and 306 corresponding to a ½ wavelength separation related to the high frequency signals 229H. The spacing of the electrodes in regions 401 and 406 corresponds to a ½ wavelength separation related to the low frequency signals 229L. The output of the upper electrodes are coupled to and summed in a summing electrode line 72, and the output of the lower electrodes are coupled to and summed in a summing electrode line 73.

The low frequency envelope of the summed output signal developed across electrode lines 72 and 73 reaches a maximum at time $t_3$ of FIG. 3, indicating the presence of a vertical sync pulse. Thus SAW 251 functions as a pulse compression filter to produce a compressed pulse from the vertical sync information.

Lines 72 and 73 are coupled to an envelope detector of a vertical sync detector circuit 254 to remove the high frequency components of the compressed output signal. A threshold comparator 78 produces an output vertical sync pulse 55' upon the occurrence of the vertical sync pulse within the composite video signals. The threshold level is determined by the adjustment of a wiper arm of a potentiometer 79. Envelope detector 74 may comprise a diode demodulator comprising a resistor 75 across lines 72 and 73, a diode 76 coupled to line 73 and a shunt capacitor 77 coupled to diode 76. The cathode of diode 76 is coupled to the negative input terminal of comparator 78.

Figure 8:
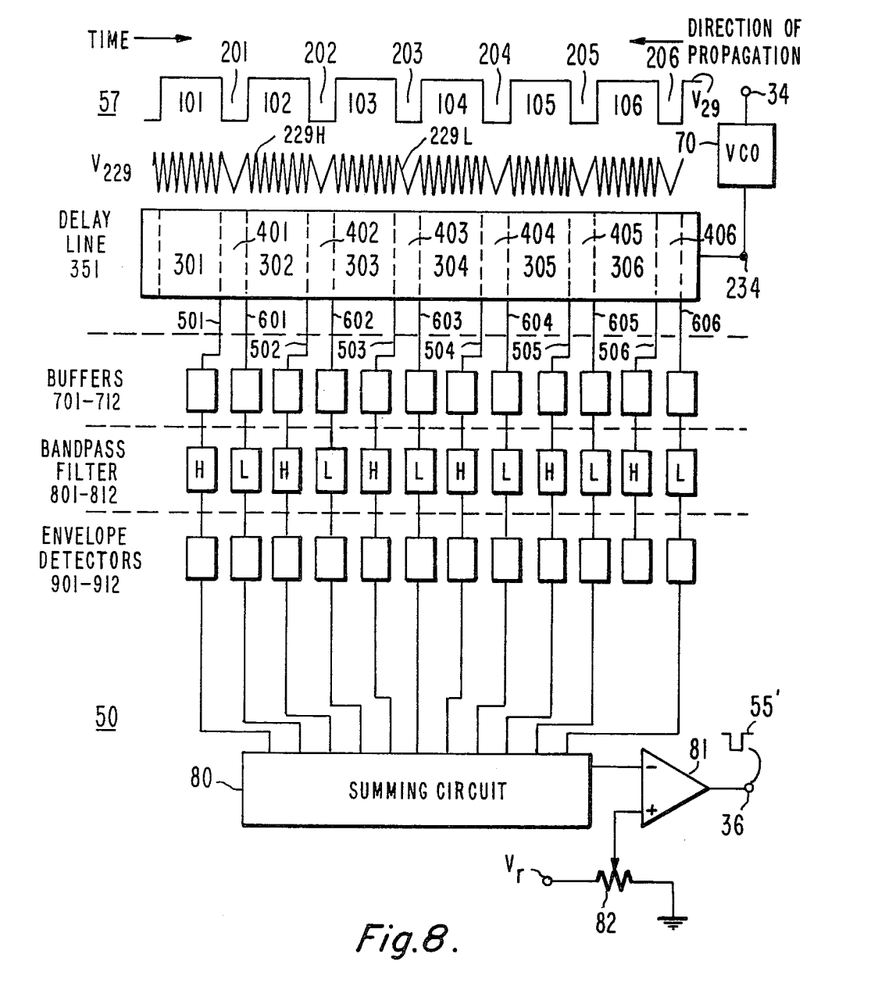
FIG. 8 illustrates still another vertical sync separator embodying the invention.

Use of a SAW device to store and sample successive portions of the frequency modulated composite video voltage $V_{229}$ may require too large a path length in the device or thus use of a plurality of devices series coupled. FIG. 8 illustrates a vertical sync separator circuit 50 embodying the invention, that is also capable of processing frequency modulated composite video signals but does not use a SAW device as a delay line. Amplitude modulated composite video voltage $V_{29}$ is transformed by a voltage controlled oscillator 70 into a frequency modulated composite video voltage $V_{229}$ at a terminal 234. High frequency portions 229H of $V_{229}$ are developed during the occurrence of sync tip portions 101-106 of the serrated vertical pulse 57, whereas the low frequency portions 229L of $V_{229}$ are developed during the occurrence of serrated portions 201-206.

Frequency modulated composite video voltage $V_{229}$ is inputted into a delay line 351 which may, for example, comprise a charge coupled device. The length of delay line 351 is selected such that during the ocurrence of a serrated vertical sync pulse 57, at time $t_3$ of FIG. 3, regions 301-306 are filled with high frequency portions 229H of $V_{229}$ and regions 401-406 are filled with low frequency portions 229L.

Sampling tap lines 501-506 are formed adjacent the beginning locations of regions 301-306 and sampling tap lines 601-606 are formed adjacent the beginning locations of regions 401-405. Taps 501-506 and 601-606 sample the frequency modulated composite video voltage $V_{229}$ as it passes through delay line 351. The sampled information at each of the taps of the delay line is coupled to a respective one of FET buffer amplifiers 701-712. At the output of each buffer amplifier is developed a frequency modulated voltage corresponding to $V_{229}$. The output voltage of each successive amplifier however is phase delayed with respect to the output voltage of the previous amplifier.

The output of each of the FET buffer amplifiers 701-712 is coupled to a respective one of bandpass filters 801-812. Buffer amplifiers 701-712 function, in part, to match the high impedance requirements of the bandpass filters. The bandpass frequency of a given set of filters 801-812 is selected to pass only the high frequencies associated with portions 229H of $V_{229}$ if the given filter is coupled to tap lines 501-506 of regions 301-306, or to pass only the low frequencies associated with portions 229L or $V_{229}$, if the given filter is coupled to tap lines 601-606 of regions 401-406.

At time $t_3$ of FIG. 3 when the frequency modulated voltage portion of $V_{229}$ associated with sync pulse 57 fills the delay line 351, the outputs of all bandpass filters 801-812 are maximums. The outputs of the bandpass filters are summed in a summing circuit 80 after the high frequency components of the outputs are removed by envelope detectors 901-912, any one of which detectors may be of design similar to envelope detector 74 of FIG. 6.

The output of summing circuit 80 is thus a compressed pulse which is then coupled to an input terminal of a threshold comparator 81. During the occurrence of a vertical sync pulse 57, the output of summing circuit 80 is a maximum, enabling comparator 81 to develop an output sync pulse 55' at a terminal 36. The threshold level of comparator 81 is adjusted by adjusting the wiper arm of a potentiometer 82.

Delay line 351 need not be a semiconductor device but may, as illustrated in FIG. 9, be constructed as a lumped LC coil 351', with taps 501-506 and 601-606 being coupled to appropriate locations along the coil.

Other embodiments of the invention will be obvious to those skilled in the art. For example, increased noise immunity can be obtained by increasing the delay of the delay line, so as to allow sampling of the composite video during the equalizing pulse intervals as well as the vertical synchronizing pulse intervals. A cost reduction may be obtained by decreasing the delay of the delay line and the number of taps, so long as adequate sensitivity for the application remains. The described sync separator may be used in conjunction with further signal processing, such as by a vertical count-down system for producing a deflection drive signal. Differences in amplitude between the response of taps near the input end of the delay line compared with that near the output end resulting from signal attenuation in the delay line may be compensated for by proper selection of the weighting resistors.

What is claimed is:

1. A pulse compression vertical sync separator for a television receiver, comprising:
   an input terminal for coupling an input signal that includes a vertical sync signal;
   a delay line coupled to said input terminal for storing successive portions of said input signal, the capacity of said delay line sufficient to store a uniquely profiled portion of said vertical sync signal;

sampling means coupled to said delay line for sampling the values of said successive portions;

pulse compression means coupled to said sampling means and responsive to the sampled values for forming a compressed pulse upon the occurrence of said vertical sync signal; and output means coupled to said pulse compression means for forming an output signal in response to said compressed pulse.

2. A separator according to claim 1 wherein said sampling means comprises a plurality of taps.

3. A separator according to claim 2 wherein said pulse compression means comprises a plurality of comparators, each coupled to one of said plurality of taps.

4. A separator according to claim 3 wherein said pulse compression means further comprises a summing circuit to which circuit are coupled the outputs of said plurality of comparators.

5. A separator according to claim 4 wherein said output means comprises a threshold comparator.

6. A separator according to claim 5 wherein said delay line comprises a charge transfer device.

7. A separator according to claim 6 wherein said vertical sync signal includes serration associated portions and sync tip associated portions.

8. A separator according to claim 1 wherein said input signal is frequency modulated.

9. A separator according to claim 8 wherein said sampling means comprises a plurality of taps.

10. A separator according to claim 9 wherein said pulse compression means comprises a plurality of bandpass filters, each of said filters coupled to one of said taps.

11. A separator according to claim 10 wherein said pulse compression means further comprises a plurality of envelope detectors coupled to said plurality of bandpass filters and a summing circuit coupled to said plurality of envelope detectors.

12. A separator according to claim 11 wherein said output means comprises a threshold comparator.

13. A separator according to claim 12 wherein said vertical sync signal includes serration associated portions and sync tip associated portions.

14. A separator according to claim 13 wherein said delay line comprises one of a charge transfer device and a lumped LC element.

15. A separator according to claim 8 wherein said delay line comprises a surface acoustic wave device, said sampling means comprising interdigitated electrodes, the spacing of said electrodes selected to attenuate frequencies not associated with said vertical sync pulse.

16. A separator according to claim 15 wherein said pulse compression means comprises a summing electrode arrangement coupled to said interdigitated electrodes for summing the signals developed by said interdigitated electrodes.

17. A separator according to claim 16 wherein said output means comprises an envelope detector coupled to said summing electrode arrangement and a threshold comparator coupled to said envelope detector.

18. A vertical synchronizing signal separator for a television display, comprising:

a source of an input signal including a recurrent vertical synchronizing signal interval;

a delay line coupled to said source for storing analog values of a portion of said input signal, said portion capable of encompassing said vertical synchronizing signal interval;

a plurality of taps located along said delay line for sampling the analog values of said portion of said input signal stored at the tap locations;

means coupled to said plurality of taps for developing a plurality of analog voltages, each representative of the deviation of an analog value of said input signal developed at a respective tap location at a given sampling instant from the analog value developed at that same location at the instant when that portion of the input signal representing the vertical synchronizing signal interval is stored in said delay line; and means responsive to said plurality of deviation representative analog voltages for generating a vertical synchronizing output pulse upon the occurrence of said vertical synchronizing signal interval.

19. A separator according to claim 18 wherein said delay line comprises a charge transfer device.

20. A separator according to claims 18 or 19 wherein said synchronizing output pulse generating means comprises a summing circuit for developing a weighted sum of said plurality of analog voltages and a threshold comparator coupled to said summing circuit for developing said output pulse.

* * * * *